Figure 1:
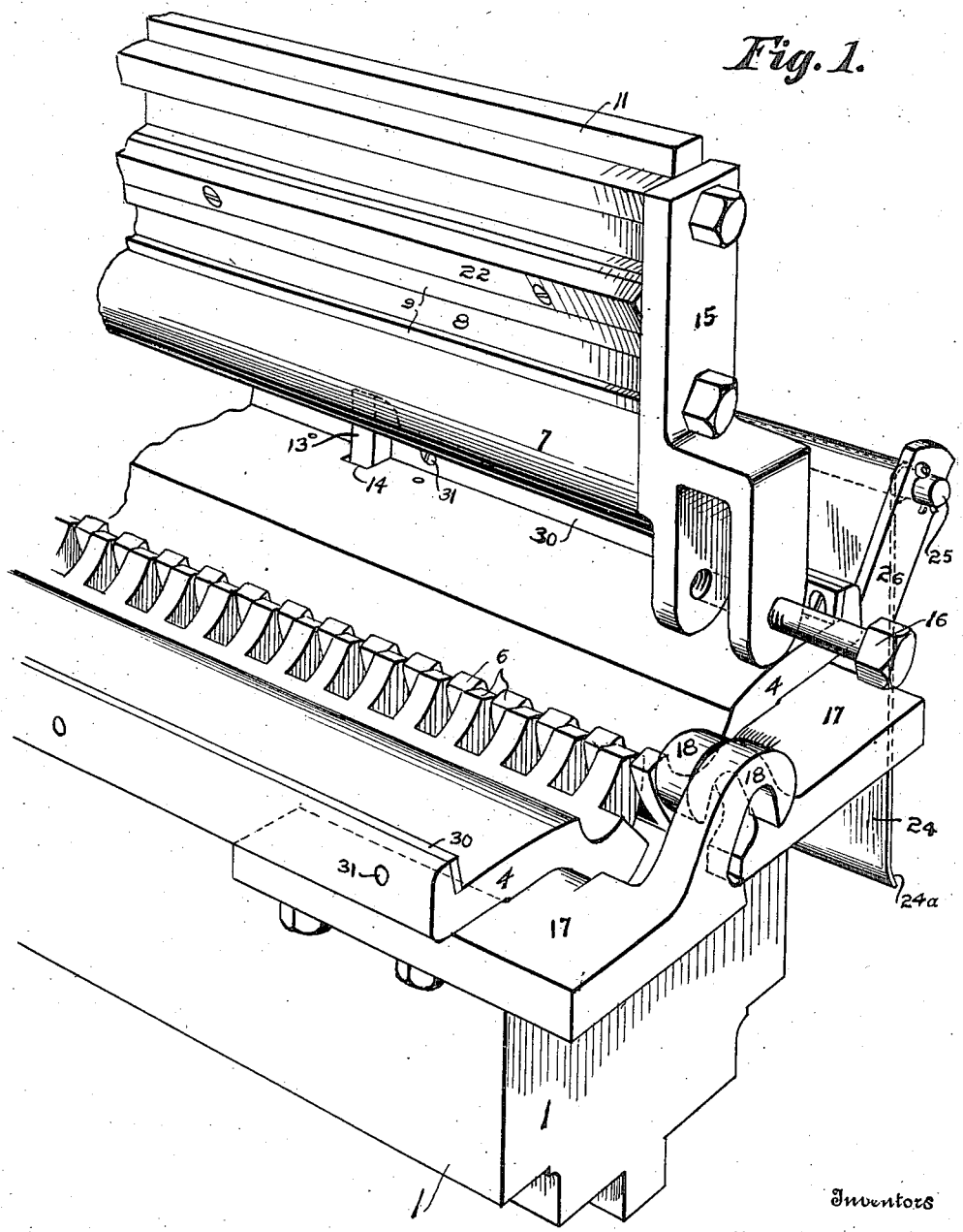

T. C. BELDING & J. J. ZINSLEN.
M. B. BELDING, ADMINISTRATRIX OF T. C. BELDING, DEC'D.
RIDGE ROLL FORMING DIE.
APPLICATION FILED OCT. 10, 1908. RENEWED JUNE 8, 1912.
1,045,089.
Patented Nov. 19, 1912.
3 SHEETS—SHEET 2.
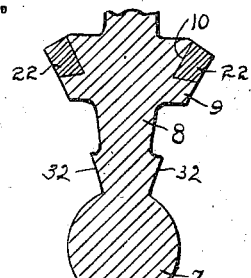
Fig. 2.
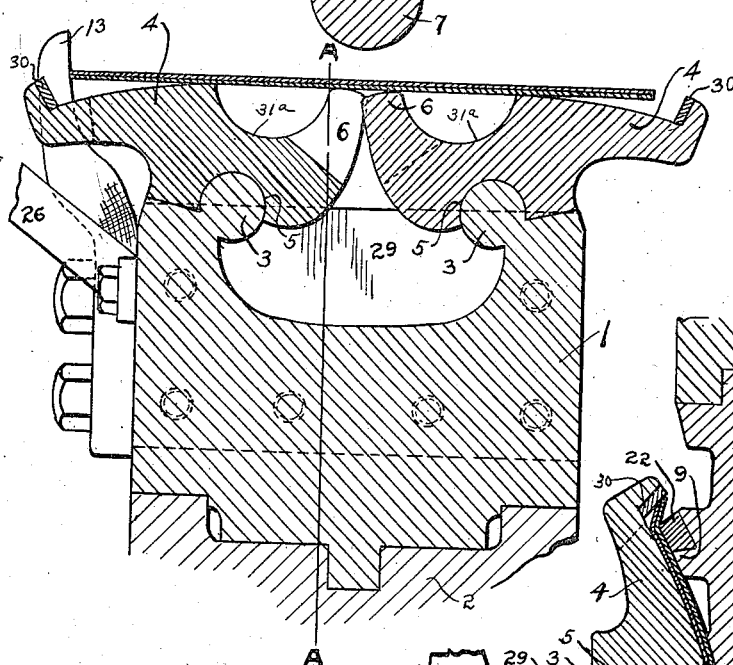
Fig. 3.
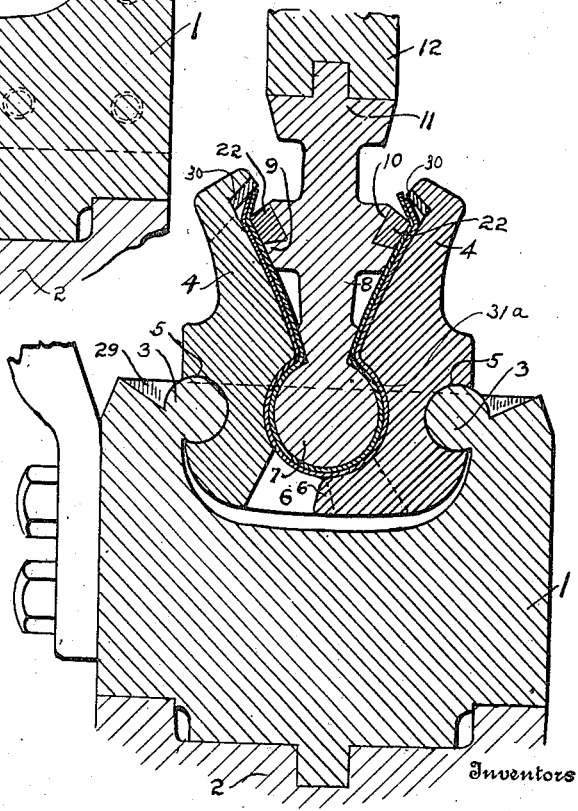
Fig. 4.
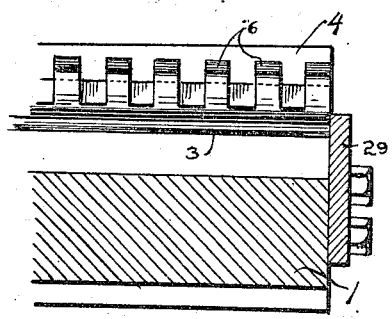
Witnesses
Jos J. Hosler.
Sylvia Boron.
Inventors
Thomas C. Belding
Joseph J. Zinslen
By Bond & Miller
Attorneys T. C. BELDING & J. J. ZINSLEN.
M. B. BELDING, ADMINISTRATRIX OF T. C. BELDING, DEC'D.
RIDGE ROLL FORMING DIE.
APPLICATION FILED OCT. 10, 1908. RENEWED JUNE 8, 1912.
1,045,089.
Patented Nov. 19, 1912.
3 SHEETS—SHEET 3.
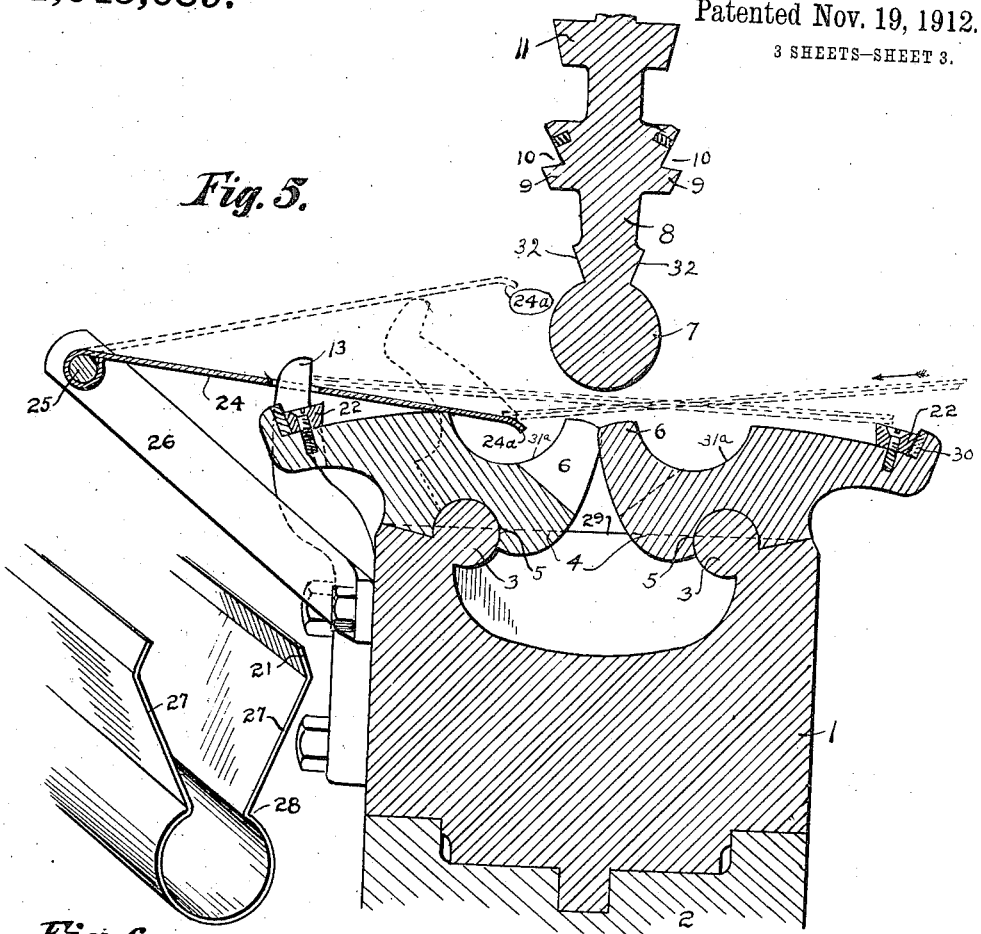
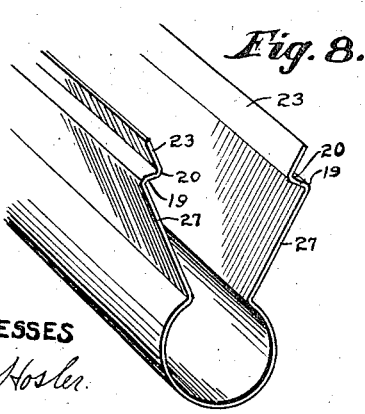
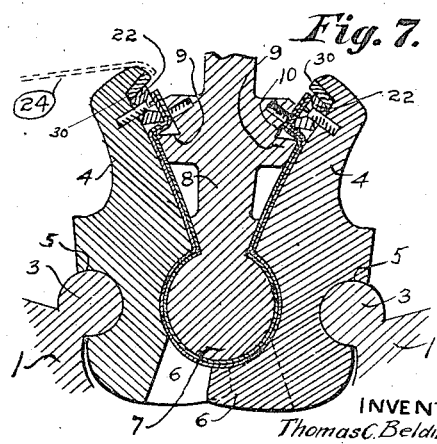
WITNESSES
Jos. J. Hosler.
Sylvia Boron.
INVENTORS
Thomas C. Belding.
Joseph J. Zinslen
BY Bond & Miller
ATTORNEYS

UNITED STATES PATENT OFFICE.

THOMAS C. BELDING AND JOSEPH J. ZINSLEN, OF CANTON, OHIO; MARY B. BELDING, ADMINISTRATRIX OF SAID THOMAS C. BELDING, DECEASED, ASSIGNORS TO THE CANTON ART METAL COMPANY, OF CANTON, OHIO, A CORPORATION OF OHIO.

RIDGE-ROLL-FORMING DIE.

1,045,089.

Specification of Letters Patent.

Patented Nov. 19, 1912.

Application filed October 10, 1908, Serial No. 457,091. Renewed June 8, 1912. Serial No. 702,619.

*To all whom it may concern:*

Be it known that we, THOMAS C. BELDING and JOSEPH J. ZINSLEN, citizens of the United States, residing at Canton, in the county of Stark and State of Ohio, have jointly invented certain new and useful Improvements in Ridge-Roll-Forming Dies; and we do hereby declare that the following is a full, clear, and exact description of the same, reference being had to the accompanying drawings, making a part of this specification, and to the numerals and figures of reference marked thereon, in which—

Figure 1 is a perspective view, showing the die-jaws open and the pressure-bar elevated and illustrating the bifurcated bar out of engagement with the die-jaw operating or opening fingers. Fig. 2 is a transverse section showing the die-jaws open, the pressure-bar elevated and a sheet of metal placed in position to be formed or pressed into a ridge roll. Fig. 3 is a transverse section of the parts shown in Fig. 2 showing the pressure-bar lowered and the die-jaws closed and illustrating a ridge roll properly formed. Fig. 4 is a section on line A—A Fig. 2. Fig. 5 is a transverse section, showing the die-jaws opened, the pressure-bar elevated and illustrating by dotted lines a sheet partially entered and one fully entered. Fig. 6 is a detached view showing a portion of a finished ridge roll as formed by the pressure-bar as illustrated in Fig. 3. Fig. 7 is a transverse section showing the die-jaws closed, the pressure-bar lowered and the flange forming dies located upon the die-jaws. Fig. 8 is a view showing a portion of a finished ridge roll as formed by the die-jaws and dies illustrated in Fig. 7.

The present invention has relation to ridge roll forming dies and it consists in the novel arrangement hereinafter described and more particularly pointed out in the claims.

Similar numerals of reference indicate corresponding parts in all the figures of the drawing.

In the accompanying drawings, 1 represents the base, which is supported upon the bed-plate 2, which bed-plate constitutes a part of any well known press, such as commonly used in pressing or forming sheet metal. The base 1 is provided with the parallel beads or rolls 3, which beads or rolls are preferably formed of a length to correspond with the length of the die-jaws 4, said die-jaws being provided upon their bottom or undersides with grooves 5 adapted to receive the beads or rolls 3, whereby a hinge or joint is produced, as between the base 1 and the die-jaws 4. Each of the die-jaws 4 are provided with what might be termed teeth or fingers 6, which teeth or fingers interlace as best illustrated in Fig. 1 and are so interlaced for the purpose of producing a continuous and unbroken support for the sheet of metal designed to be operated upon at the initial bend of the sheet. Directly above the die-jaws 4 is located the pressure-bar proper, which pressure-bar is provided with the bead or roll 7 at its lower edge and the integral web 8, is provided with the lateral flanges 9 in which lateral flanges are cut or formed the open grooves 10. The web 8 is continued a distance above the flanges 9 and is provided with an integral connecting bar 11, which integral connecting bar is connected in the usual manner to a reciprocating bar such as 12 shown in Fig. 3, which bar constitutes one of the working parts of a common and well known press and is operated in the usual manner by eccentrics mounted upon a rotating shaft and links or bars connected to the bar 12. These parts designed to operate the pressure-bar proper having the bead or roll 7 and the flanges 9 constitute no part of the present invention, except that they must necessarily be present to constitute a working machine. To the base 1 is attached the stop 13, which stop extends upward through the recess 14 formed in what might be termed the rear die-jaw. In the drawing we have illustrated but a single stop 13, but it will be understood that stops 13 should be located at intervals so as to bring the sheets designed to be operated upon in proper alinement with the die-jaws and the pressure-bar.

In operation the die-jaws 4 are brought into the positions illustrated in Figs. 1, 2 and 5, at which time the pressure-bar proper is elevated so as to space said pressure-bar form the tops of the die-jaws 4. When the parts are in the positions just above described a sheet or sheets of metal are placed upon the tops of the die-jaws, after which a downward movement is given to the pressure bar proper, which downward movement brings the lower surface of the bead or roll 7 into contact with the upper surface of the sheet and by a continuous downward movement of the said pressure-bar a rocking or oscillating movement is imparted to the die-jaws 4, said downward movement of the pressure-bar being continued until the die-jaws have assumed the positions illustrated in Figs. 3 and 7 and a sheet or sheets of metal bent or formed as illustrated in said Figs. 3 and 5, or in other words a ridge roll is produced. Upon the upward movement of the plunger proper the die-jaws will be parted or oscillated and when the pressure bar has reached its full height the die-jaws will assume the positions illustrated in Figs. 1, 2 and 5.

To one end of the pressure-bar proper carrying the integral bead or roll 7 is attached the bifurcated bar 15, the bottom or lower end of which bifurcated bar is provided with the bolt 16, which bolt is for the purpose hereinafter described. To the die-bars 4 are attached the plates 17, which plates are provided with the integral curved fingers 18, which curved fingers are located over the bolt 16 so that an upward movement of the pressure-bar carrying the bifurcated bar 16 will impart a positive opening movement to the die-jaws 4. It will be understood that the movement of the bifurcated bar 15 and the pressure-bar proper should be so timed that when the extreme upward movement of the pressure-bar has been reached the die-jaws will have been fully opened and in such positions with respect to each other that sheets of metal can be placed in position to be formed into ridge rolls by the downward movement of the pressure-bar and the closing movement of the die-jaws. In some instances it may be desirable to form ridge rolls with two bends such as 19 and 20 and in other instances it may be desirable to have but a single bend such as 21, and in order to provide for forming ridge rolls of the two styles shown in Figs. 6 and 8 the die, or what might be termed bend or flange forming dies 22 are provided which are connected to the pressure-bar proper or to the die-jaws 4, reference being had to the particular style of ridge roll designed to be formed. The flange forming dies 22 when connected to the pressure-bar as illustrated in Figs. 2 and 3 form or produce a single bend in the sheets operated upon as illustrated in Fig. 3 and in the finished product Fig. 6. When two bends such as 19 and 20 are desired whereby the ridge roll connecting flanges 23 are produced the die-bars 22 are transposed, or in other words removed from the pressure-bar and connected to the die-jaws as illustrated in Figs. 5 and 7.

In order to provide means for rapidly and without inconvenience placing the sheets of metal into position to be operated upon a guide apron or plate 24 is provided, which apron or plate is hinged to the bar 25, which bar is carried by the bracket arms 26 said bracket arms being attached to the base 1 or its equivalent. It will be noted that the plate or apron 26 is located below the sheet or sheets of metal designed to be formed into a ridge roll when said sheets are placed in position to be operated upon, but owing to the fact that said apron is held against any sliding or reciprocating movement by the bar 25 that as the die-jaw 4 located directly under the apron or plate 24 is rocked or oscillated, said apron will be moved or swung upward as indicated in dotted lines Fig. 5, which upward swinging movement withdraws said apron from under the sheets and into such a position that it does not interfere in any way with the formation of the ridge roll during the time the ridge roll is being formed.

It is well understood that in the pressing of metal more or less spring action takes place after the metal has been formed owing to the strain brought upon the metal during its formation and in order that the ridge rolls may when finished have straight diverging parts such as 27 between the bends 28 and 19 or 21 the working faces of the die-jaws 4 are slightly convexed by which arrangement the metal operated upon is slightly bowed or brought into convexo-concavo form, but when the sheets are released from their greatest strained position they will assume the form shown in the finished product, Figs. 6 and 8.

For the purpose of preventing any end movement of the die-jaws the base 1 is provided with the plate 29 which plate prevents end movement in one direction and the bifurcated bar 15 assists in holding the die-jaws from end movement in either direction, but we do not desire to be confined to any specific device or devices for holding the die-jaws against end movement as many ways may be provided without departing from the nature of our invention.

It is well understood that more or less wear will take place from long and continued use during the time the ridge rolls are being formed and especially as between the edges of the sheets and the parts coming in contact therewith and in order to provide against this wear at little expense the die-jaws 4 are provided with the wear plates 30, which wear plates are connected to the die-jaws by means of suitable rivets or their equivalents 31, which wear plates can be replaced from time to time.

It will be understood that the die-jaws 4 should be provided with grooves 31$^a$, which grooves are so located that when the die-jaws are brought into their clamping positions the surfaces of the grooves 31$^a$ will be so positioned that the sheets of metal will be clamped or pressed between the surfaces of the grooves 31ª and the surface of the bead or roll 7, so that a roll is formed upon the finished product.

For the purpose of providing contact points as between the sheets and the pressure-bar proper, said pressure-bar is provided with the lateral flanges 9 and the inclined surfaces 32. The lateral flanges 9 having inclined outer edges or faces whereby the edges of the lateral flanges and the adjacent faced portions of the die-jaws are brought into substantially parallel relationship with reference to each other, taking into consideration the convexity of the working surfaces of the die-jaws when said die-jaws are brought into their extreme closed positions.

It will be understood that various sizes and shapes of die-jaws and pressure-bars, can be substituted for the ones shown in the drawings.

In some instances it may be desirable to turn the apron 24 down and into the position shown in Fig. 1 and this is more especially true when the flange forming dies 22 are located upon the pressure-bar proper.

It will be understood that the apron 24 should be provided with the angled flange 24ª, which angled flange serves the purpose of lifting and guiding the sheets as they are placed in the position to be acted upon.

Having fully described our invention what we claim as new and desire to secure by Letters Patent, is—

1. In a ridge roll forming die of the class described, a base held in fixed position, die-jaws hinged to the base, said die-jaws provided with fingers, said fingers adapted to interlace and the die-jaws provided with concave surfaces adjacent said fingers, and a pressure bar provided with a roll or head, said pressure bar adapted to move in a vertical plane between the hinged die-jaws, substantially as and for the purpose specified.

2. In a ridge roll forming die of the class described, a base held in fixed position, die-jaws hinged to the base, said die-jaws provided with convexed and concaved working surfaces and interlacing curved fingers and a pressure bar adapted to move in a vertical plane between the hinges of the die-jaws, substantially as and for the purpose specified.

3. In a ridge roll forming die of the class described, a base held in fixed position, die-jaws hinged to the base, said die-jaws provided with convexed and concaved working surfaces and interlacing curved fingers, a pressure bar adapted to move in a vertical plane between the hinges of the die-jaws, said pressure bar adapted to actuate the die-jaws by contact with the curved fingers.

4. In a ridge roll forming die, the combination of a fixed base, die-jaws hinged to said base, said die-jaws provided with spaced fingers, said fingers adapted to interlace, the die-jaws provided with concaved surfaces, said concaved surfaces located adjacent the curved fingers, said jaws provided with convexed surfaces, said convexed surfaces located adjacent the concaved surfaces, a pressure bar provided with a bead or roll at its lower portion, said pressure bar adapted to move in a vertical plane intermediate the hinged die-jaws and the roll adapted to actuate the die-jaws during its downward movement, substantially as and for the purpose specified.

5. In a ridge roll forming die, the combination of a fixed base, die-jaws provided with curved spaced fingers and convexed and concaved working surfaces, a pressure bar provided with a bead or roll, the working surfaces of said bead or roll having a curvature corresponding substantially with the curvature of the concaved working surface of the die-jaws, said pressure bar adapted to move in a vertical plane intermediate the hinged die-jaws, substantially as and for the purpose specified.

6. In a ridge roll forming die, the combination of a fixed base, die-jaws provided with curved spaced fingers and convexed and concaved working surfaces, a pressure bar provided with a bead or roll, the working surfaces of said bead or roll having a curvature corresponding substantially with the curvature of the concaved working surface of the die-jaws, said pressure bar adapted to move in a vertical plane intermediate the hinged die-jaws, and to actuate the die-jaws during its downward movement, substantially as and for the purpose specified.

7. In a rigid roll forming device, a base provided with spaced parallel ribs, die-jaws pivotally mounted upon said parallel ribs, a pressure bar movable in a vertical plane and between the pivotal connections of the die-jaws, said pressure bar provided with spaced lateral flanges and a roll located below the lowermost pair of lateral flanges, the die-jaws provided with convexed and concaved working surfaces, said die-jaws provided with interlacing curved fingers adapted for contact with the roll of the pressure bar, substantially as and for the purpose specified.

8. In a ridge roll forming device, a base provided with parallel ribs, die jaws pivotally mounted upon said ribs, a pressure bar movable in a vertical plane between the pivotal connection of the die-jaws, said pressure bar provided with lateral flanges and flange forming dies, and a roll, and the die-jaws provided with curved interlacing fingers, substantially as and for the purpose specified.

9. In a ridge roll forming die, the combination of a base, oscillating die-jaws mounted upon the base, said die-jaws provided with convexed and concaved faces, fingers carried by the die-jaws, a reciprocating pressure bar and means carried by the pressure bar adapted to actuate the die-jaws during the upward movement of the pressure bar, substantially as and for the purpose specified.

10. In a ridge roll forming die, the combination of a base, oscillating die-jaws mounted upon the base, said die-jaws provided with convexed and concaved faces, fingers carried by the die-jaws, a reciprocating pressure bar and means carried by the pressure bar adapted to actuate the die-jaws during the upward movement of the pressure bar and the fingers of the die-jaws adapted to actuate said die-jaws during the downward movement of the pressure bar.

11. In a ridge roll forming die, the combination of a base, oscillating die-jaws mounted upon the base, said die-jaws provided with convexed and concaved faces, fingers carried by the die-jaws, a reciprocating pressure-bar and means carried by the pressure-bar adapted to actuate the die-jaws during the upward movement of the pressure-bar, substantially as and for the purpose specified.

12. In a device of the character described, the combination of a base, die-jaws pivotally mounted upon the base, a ridge roll forming pressure-bar adapted to move in a vertical plane between the pivotal points of the die-jaws and a pivoted apron or guide, substantially as and for the purpose specified.

13. In a ridge roll forming die, the combination of a base, oscillating die-jaws carried by the base, said die-jaws provided with spaced teeth, and the teeth located in different transverse planes with reference to the die-jaws, a pressure bar adapted to reciprocate, said pressure-bar adapted to actuate the die-jaws in their closing movement and means carried by the pressure-bar adapted to actuate the die-jaws in their opening movement substantially as and for the purpose specified.

14. In a ridge roll forming die, the combination of a base, oscillating die-jaws carried by the base, said die-jaws provided with spaced teeth, and the teeth located in different transverse planes with reference to the die-jaw, a pressure-bar adapted to reciprocate, said pressure-bar adapted to actuate th edie-jaws in their closing movement and means carried by the pressure-bar adapted to actuate the die-jaws in their opening movement, and the outer edges of the die jaws provided with detachable wear plates, substantially as and for the purpose specified.

15. In a ridge roll forming die, the combination of a base, oscillating die-jaws carried by the base, said die-jaws provided with spaced teeth and the teeth located in different transverse planes with reference to the die-jaws, a pressure-bar adapted to reciprocate, said pressure-bar adapted to actuate the die-jaws in their closing movement and means carried by the pressure-bar adapted to actuate the die-jaws in their opening movement and the outer edges of the die-jaws provided with detachable wear plates, and a pivoted apron, substantially as and for the purpose specified.

In testimony that we claim the above, we have hereunto subscribed our names in the presence of two witnesses.

THOMAS C. BELDING.
JOSEPH J. ZINSLEN.

Witnesses:
J. A. JEFFERS,
WM. H. MILLER.